(12) United States Patent
Rao

(10) Patent No.: US 8,097,996 B1
(45) Date of Patent: Jan. 17, 2012

(54) THERMALLY CONDUCTIVE GROUND WALL INSULATION FOR A STATOR BAR

(76) Inventor: Dantam K Rao, Schenectady, NY (US)

(*) Notice: Subject to any disclaimer, the term of this patent is extended or adjusted under 35 U.S.C. 154(b) by 0 days.

(21) Appl. No.: 13/168,366

(22) Filed: Jun. 24, 2011

(51) Int. Cl.
*H02K 3/34* (2006.01)

(52) U.S. Cl. .................................................. 310/215

(58) Field of Classification Search .................. 310/215, 310/196, 43, 45
See application file for complete search history.

(56) References Cited

U.S. PATENT DOCUMENTS

| | | | |
|---|---|---|---|
| 5,650,031 A | 7/1997 | Bolon et al. | |
| 5,710,475 A | 1/1998 | Irwin et al. | |
| 6,498,415 B1 * | 12/2002 | Emery | 310/196 |
| 6,960,859 B2 | 11/2005 | Baumann et al. | |
| 7,026,554 B2 | 4/2006 | Lee et al. | |
| 7,395,593 B2 | 7/2008 | Wang et al. | |
| 7,547,847 B2 | 6/2009 | Miller | |
| 7,655,868 B2 | 2/2010 | Sheaffer et al. | |
| 7,832,081 B2 | 11/2010 | Wang et al. | |
| 7,863,795 B2 | 1/2011 | Joho | |
| 7,875,347 B2 | 1/2011 | Irwin et al. | |
| 7,893,358 B2 | 2/2011 | Baumann | |
| 2005/0133720 A1 * | 6/2005 | Russel et al. | 250/324 |
| 2006/0097600 A1 * | 5/2006 | Baumann | 310/196 |

* cited by examiner

Primary Examiner — Nguyen N Hanh

(57) ABSTRACT

A method of manufacturing a stator bar in large dynamoelectric machines, with the bar insulation made of solid materials with high thermal conductivity and high dielectric strength. In the present invention, the bar insulation is provided by thermally conductive shells whose inner cavity conforms to the bar stock. The manufacturing process comprises slipping one or more thermally conductive shells at the substantially central straight portion of the bar stock, bending the ends of the bar stock to form end-arms, insulating the end-arms with tape or extrusion insulation and bonding all members to form a solid stator bar. In short, the bent end-arms are insulated by the tape or extrusion insulation while the straight portion of the bar is insulated by the thermally conductive shells. This greatly increases the effective thermal conductivity of the stator bar. The high dielectric strength of the materials significantly reduces the wall thickness of the bar insulation. The space freed by the thinner bar insulation can be filled beneficially by copper or iron thereby reducing the size of the machine. The high thermal conductivity of the bar insulation will increase the life of the stator bar, while the thinner bar insulation will reduce the size of the machine.

17 Claims, 7 Drawing Sheets

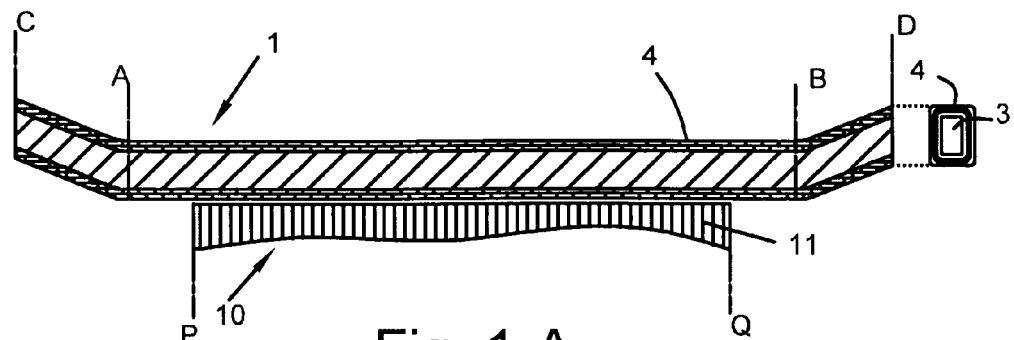
Fig. 1-A
Prior Art
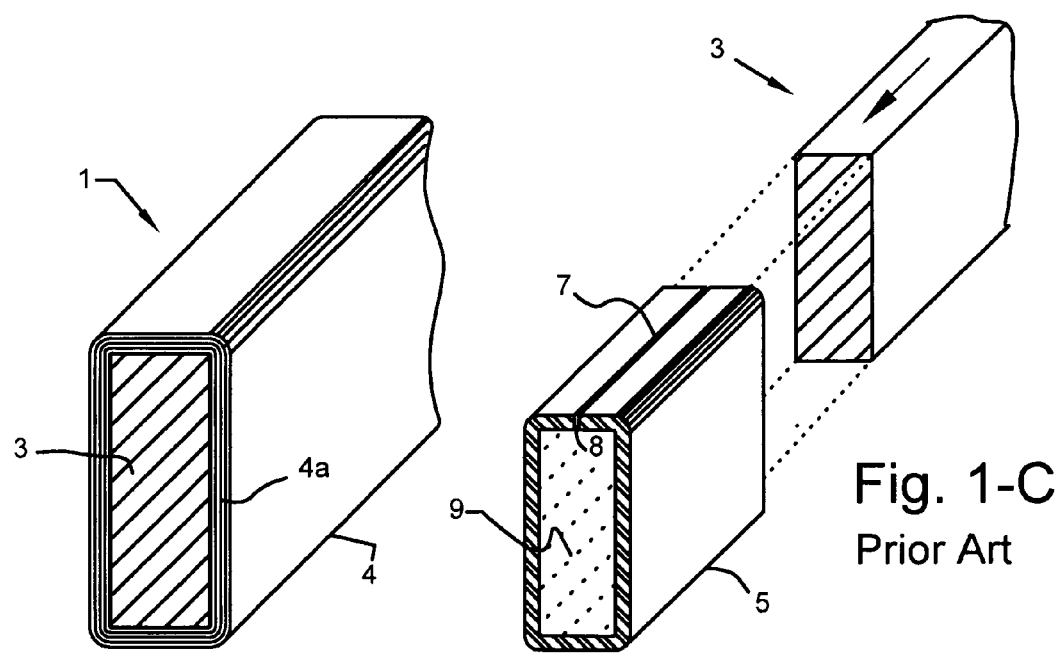
Fig. 1-B
Prior Art
Fig. 1-C
Prior Art

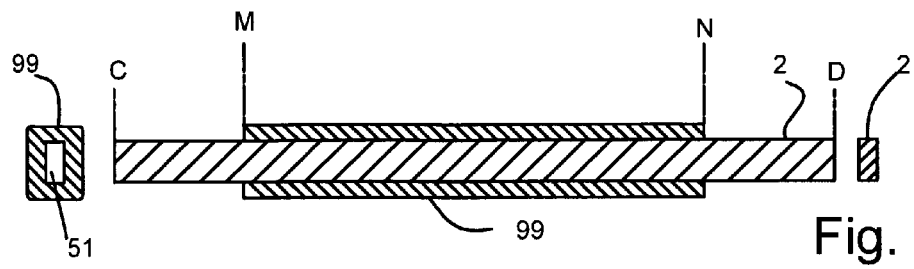
Fig. 2-A
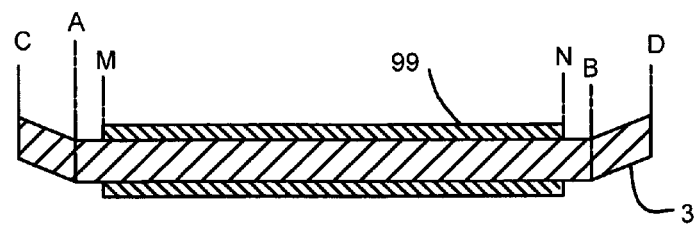
Fig. 2-B
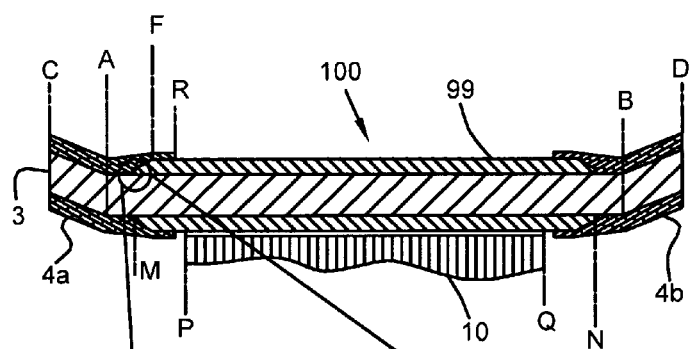
Fig. 2-C
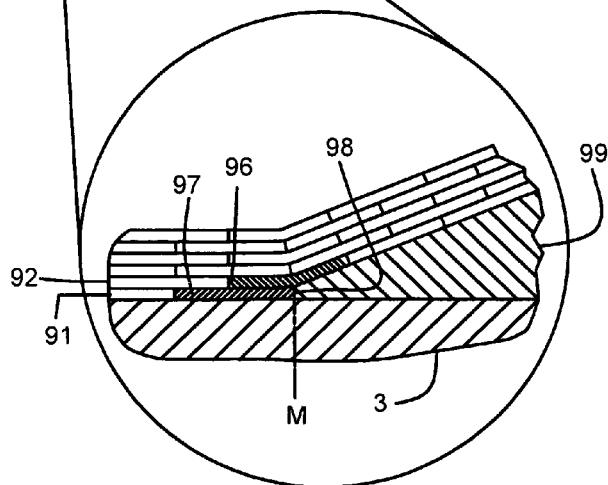
Fig. 2-D

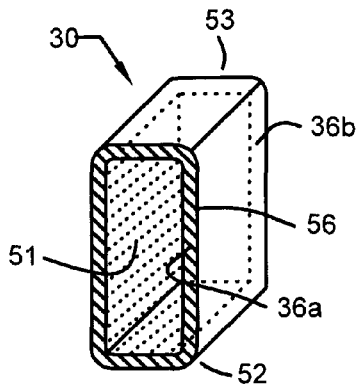
Fig. 3-A
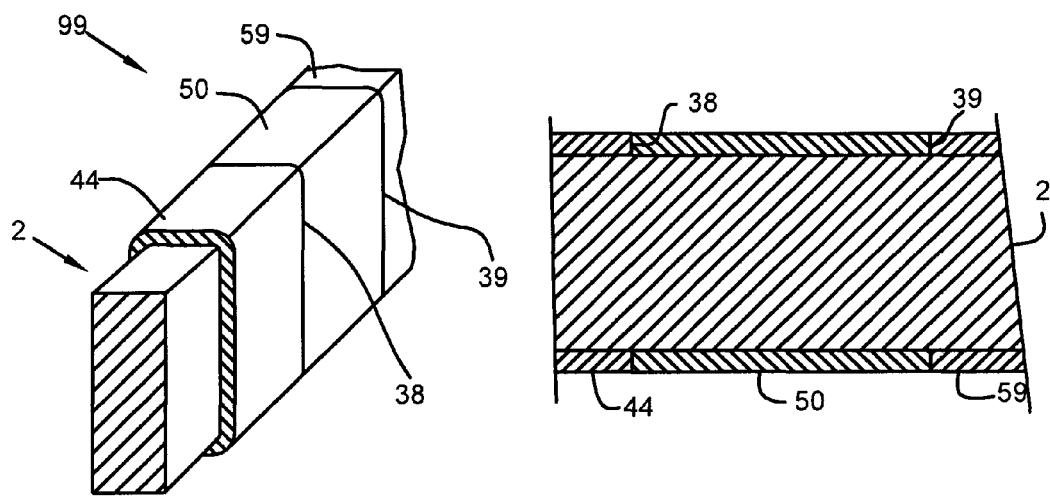
Fig. 3-B
Fig. 3-C
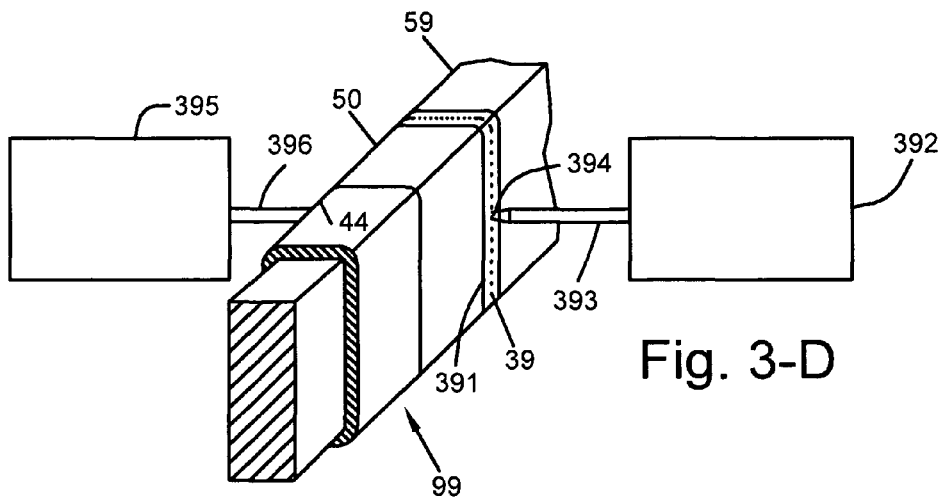
Fig. 3-D

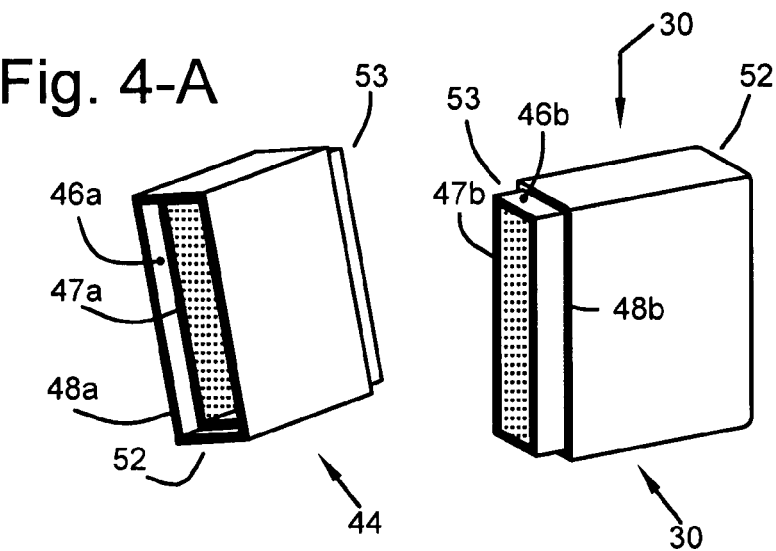
Fig. 4-A　　　Fig. 4-B
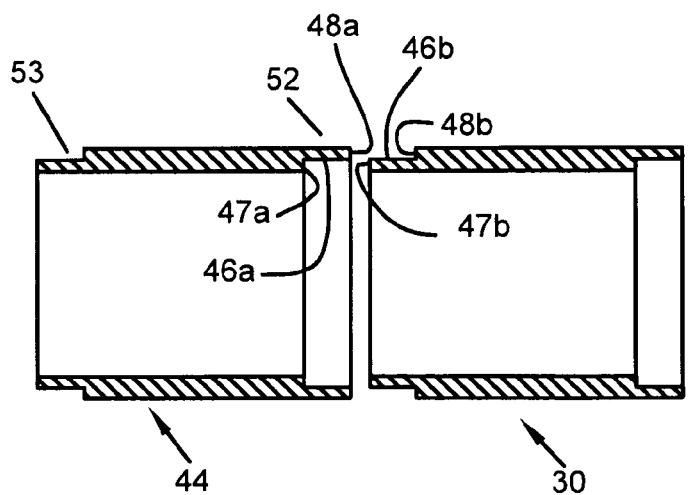
Fig. 4-C
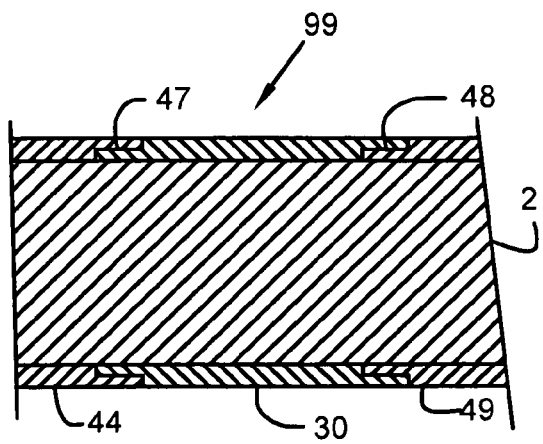
Fig. 4-D

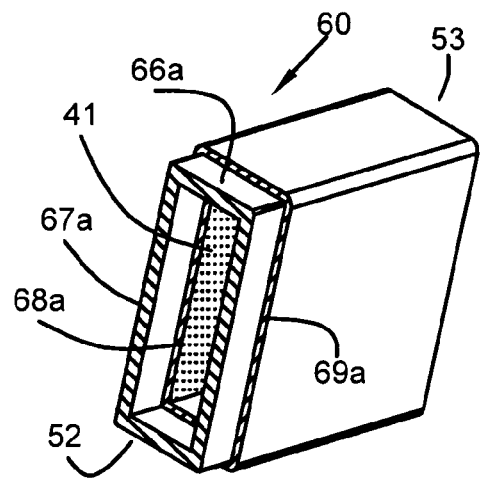
Fig. 5-A
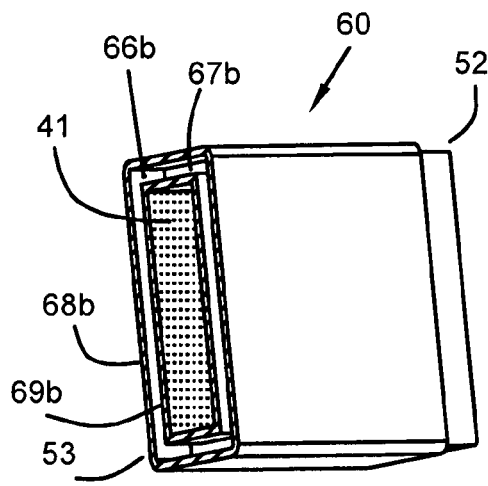
Fig. 5-B
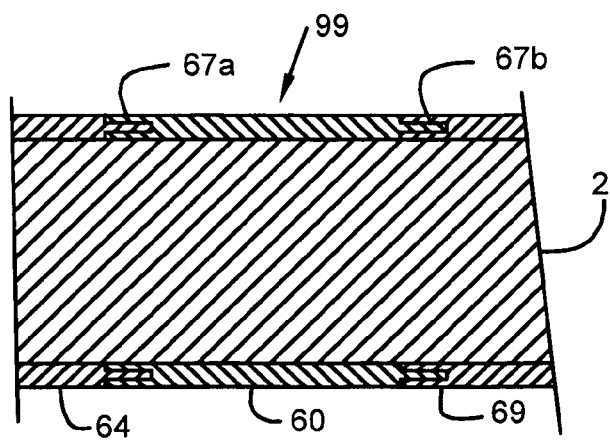
Fig. 5-C

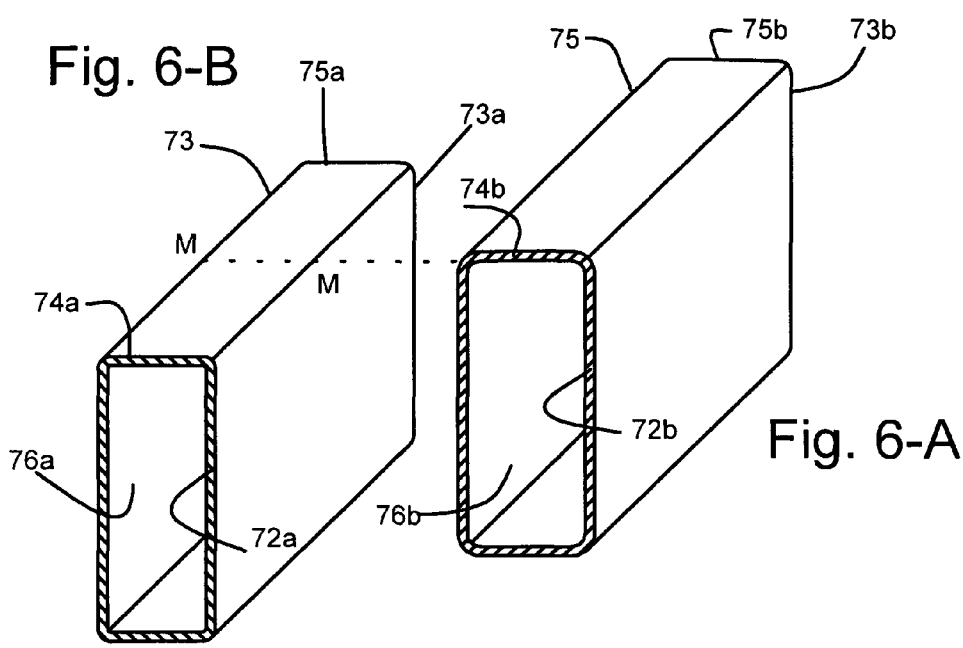
Fig. 6-B  Fig. 6-A
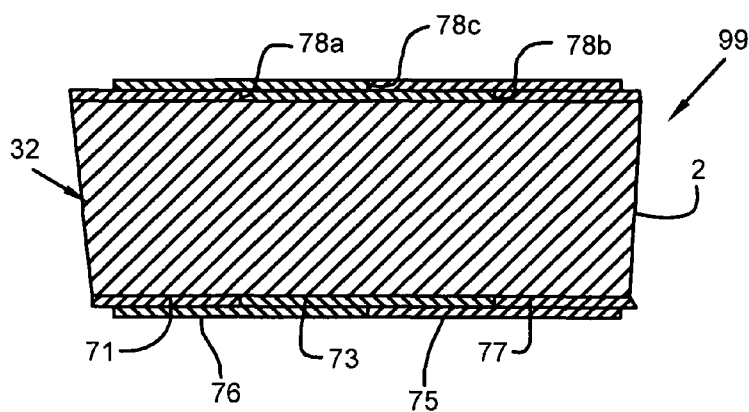
Fig. 6-C
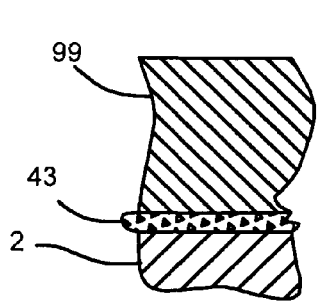
Fig. 7-A
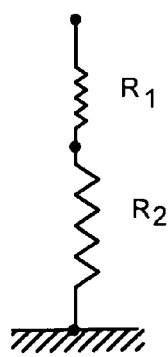
Fig. 7-B

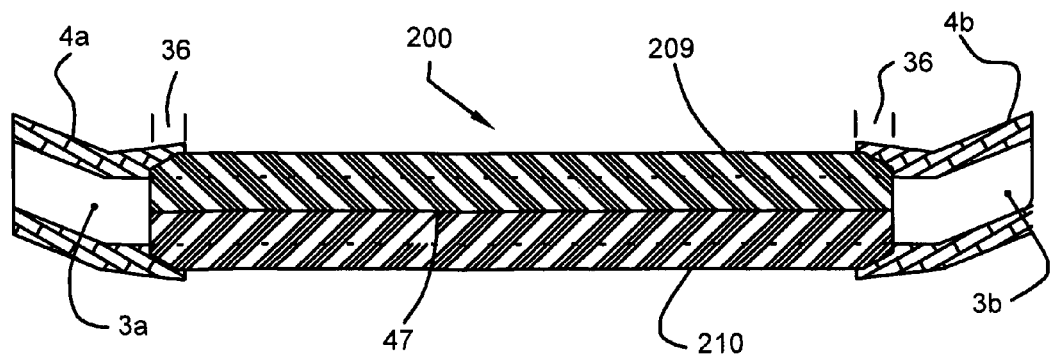
Fig. 8-A
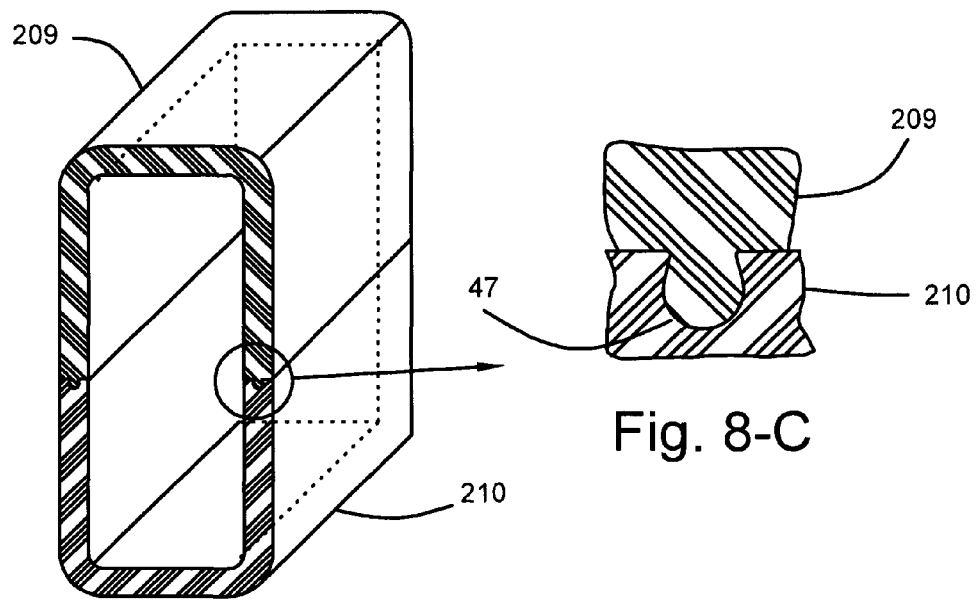
Fig. 8-B
Fig. 8-C

THERMALLY CONDUCTIVE GROUND WALL INSULATION FOR A STATOR BAR

TECHNICAL FIELD

This disclosure relates to the ground wall insulation of a stator bar in large electric machines, specifically improving the thermal conductivity of the ground wall insulation.

BACKGROUND

Large dynamoelectric machines employed in the utility industry use a long insulated conductor called a stator bar 1 (see FIG. 1-A) placed in its core. Construction of the stator bar 1 starts with a long, straight bar stock 2 (see FIG. 2-A) of precise rectangular cross-section, made of plurality of transposed insulated copper strands (not shown). Both ends of the bar stock 2 are then bent at sections A and B near the end to form end-arms AC and BD. The bar stock after bending is termed a bent-bar 3 (see FIG. 2-B) herein. The stator bar 1 in FIG. 1-A is then formed by insulating the bent-bar 3 by a high voltage-resistant insulation, termed ground wall insulation or bar insulation 4. The bar insulation 4 protects the core 10 against the large voltages of stator bar, which can range from 10 to 25 kV. The stator bar 1 hence contains a straight portion AB and bent end-arm portions AC and BD. When the stator bar 1 is inserted into the core 10, the straight portion AB protrudes beyond the end faces PQ of the core 10. The protruding straight portions PA and QB are called overhangs. The core 10 itself is made of lamination stack 11.

The bar insulation 4 thus forms a hollow rectangular sectioned shell around the bent-bar 3. Long ago, the bar insulation was made by wrapping a thin electrically insulative tape several times over a bent-bar 3 and curing it to form a solid bar. The thermal conductivity of the tape used to be about 0.3 w/mK, so machines used to be relatively large to keep it cool. In the past 20 years, electrically insulative tapes with thermally conductive fillers were developed, which increased the thermal conductivity to about 0.5 w/mK. A bar insulation with such higher thermal conductivity can reduce the stator temperature, beneficially increasing the life of the machine and its performance. In recent years, more innovative approaches to improving the thermal conductivity of bar insulation further are emerging, as summarized below.

Almost all prior-art approaches to improve the thermal conductivity of bar insulation employ thermally conductive fillers, and can be grouped into a multiphase tape 4a (FIG. 1-B), a multiphase extrusion 5 (FIG. 1-C) or a multiphase fabric. They use multiphased insulation, comprising a matrix or major phase of thermally insulative materials embedding minor phases of thermally conductive fillers. But admixture of multiple phases creates a large number of boundaries with innumerable discontinuities; it also suffers from potential trapped air spaces. The discontinuities and trapped air spaces obstruct heat flow, thereby reducing the net thermal conductivity. For example, the multiphase tape 4a may have one, two or more layers, each comprising a thermally insulative base layer with one phase of plastic tape to serve as a carrier, a second phase of fibrous weave to impart strength, a third phase of electrically insulative materials such as mica to provide electrical insulation, a fourth phase of thermally conductive fillers to provide thermal conductivity and a fifth phase of thermally insulative resin binder to bond all the phases. Several patents, e.g., U.S. Pat. No. 7,547,847 or 6,242,825 describe various layers, phases and materials used in multiphase tapes.

Even though prior-art bar insulation comprises more than half-dozen phases, the thermally conductivity of filler is the only phase that contributes to increase in thermal conductivity. All other phases, being thermally insulative, tend to reduce the thermal conductivity. The geometry of a filler greatly affects its thermal resistance. The fillers geometry can be long fibers, short whiskers (e.g., E-glass with 0.99 w/mK, Dacron glass with 0.4 W/mK), particulates (e.g., boron nitride with ~120 w/mK, aluminum oxide with 25 w/mK etc.) or flakes. Fillers with fiber or whisker geometry are mostly thermally insulative because the round shape allows thermal contact only along a line, thus obstructing heat flow; they are usually encapsulated by a resin phase that is insulative and hence obstructs heat flow. Particulate fillers are microscopic, with the largest dimension less than 15 µm (600 µinch) but microscopic nano-fillers of size less than 0.2 µm (8 µinch), are recently being introduced per U.S. Pat. Nos. 7,875,347, 7,803,457. Heat flows easily inside flake shaped particulates because of favorable aspect ratio and high thermal conductivity, but outside the flakes surface, heat transfer is obstructed by the insulative resin phase that bonds them. The problem with all fillers is that they are encapsulated by a resin binder which is mostly thermally insulative, hence overall thermal conductivity is not increased.

U.S. Pat. No. 7,655,868 describes an alternative embodiment that uses a tape made of thermally conductive fabric. The fabric in this invention is made by weaving a thermally conductive ceramic fiber phase in one or both directions. But a high thermal conductivity of fiber phase does not necessarily increase the thermal conductivity of bar insulation because, even though the heat flows easily through them, it encounters great resistance when trying to cross a boundary. These ceramic fibers have round cross section that contact only at a point or along a line, and this narrow path of transmission obstructs heat flow. Besides introduction of the ceramic fibers does not solve the fundamental problems of air voids and resin encapsulation that reduce the thermal conductivity.

Recognizing the fundamental limitations of tapes, extrusions as alternatives to tapes to increase thermal conductivity were also examined recently. The extrusion can be an in-situ or a pre-extruded member. An in-situ extruded insulation was described in U.S. Pat. Nos. 5,650,031 and 5,710,475; the method uses a moving extrusion head to deposit thermoplastic resin in-situ over a stationary bent-bar 3. But it is very difficult for an extrusion head to follow the complex 3-D shape of bent-bar 3. The technical difficulties of precisely depositing resin over complex 3-D shape of end-arms AC and BD are so challenging that currently stator bars are not made by this in-situ extrusion method. Alternately, pre-extruded members for bar insulation were also discussed in U.S. Pat. No. 7,832,081. FIG. 1-C shows one such embodiment in which the bar insulation comprises a pre-extruded insulating member 5 having a rectangular shape that defines a central cavity 9. The extruded member has a slit 7 along the entire length of the bent-bar 3. The slit 7 is made of pair of opposite edges 8. Bent-bar 3 is slipped into the cavity 9 and the slit 7 is closed by plastic welding. But an extrusion insulation 5 with a slit 7 has several disadvantages. Long plastic welds that are used to close the long slit could contain electrical defects at some points over a long span. Besides, in vibratory high temperature environment, the weld expands and contracts several million times, so it may develop a crack which could propagate and cause catastrophic degradation of the insulation. Besides, manufacturing a slitted extrusion that precisely conforms to the complex 3-D shape is technically challenging. Further, extrusions rely on fillers to improve thermal conductivity, but it is well known that fillers do not greatly enhance thermal conductivity of the bar insulation. In view of these deficiencies, there still remains a need for bar insulation with enhanced thermal conductivity.

SUMMARY

One objective of the present invention is to increase thermal conductivity of the bar insulation significantly. Another objective is to reduce the thickness of bar insulation. Another objective is to reduce the cost of manufacturing the bar insulation.

Embodiments that successfully meet these objectives offer several benefits. They could increase the power rating of the machine, increase its voltage rating, increase the life of the stator bar, reduce the size of the machine, increase the efficiency of the machine, or keep the machine cool. The invention is described in two alternative embodiments—shelled bar 100 and split-shelled bar 200.

Both embodiments 100 and 200 employ single phase materials—i.e., bulk or solids with high thermal conductivity and high dielectric strength. This contrasts with multi-phase approach of flexible tape insulation using low thermal conductivity materials that was pursued in the prior art. The single phase material is employed in two distinct geometries. A first embodiment 100 shown in FIG. 2-C employs full shell geometry, a second embodiment 200 shown in FIG. 8-A employs split-shell geometry. The single-phase material is applied preferably in the central straight portion of the bar stock only, while a thermally insulative material such as a tape or extrusion is used in the bent end-arm portions, both insulations being merged smoothly in a transition zone. Since heat is removed in the core span PQ only, applying a single phase material tc cover the core span PQ only will be sufficient to keep the stator bar cool.

Single-phase solids employed herein can be of several types, such as thermoplastics, thermosets, elastomers or ceramics. Thermoplastics may comprise a base resin (e.g., PP, ABS, PC, PA, LCP, PPS, PEEK, polyimides, bismaleimides). Thermally conductive thermoplastics can be manufactured by several firms e.g., Coolpolymers Inc, RI, Ovation Polymers, OH etc. They use thermally conductive fillers, which limits their thermal conductivity to about 3 w/mK. Thermosets and elastomers by themselves have low thermal conductivity of less than 1 w/mK. They use thermally conductive fillers to increase thermal conductivity to about 3 w/mK. So even though they are single phase solids in appearance, thermal conductivity of thermoplastics, thermosets and elastomers is defined by fillers as in the prior art.

Ceramics that are thermally conductive and electrically insulative and use a single phase are the preferred insulating materials in this invention. Examples include Alumina (Al2O3, 25 w/mK), Aluminum Nitride (AlN, 270 w/mK), Silicon Nitride (Si3N4, 155 w/mK), Boron Nitride (BN, 120 w/mK) They attain high thermal conductivity by using phonons instead of electrons, and also attain high electrical insulativity by molecular disposition of free electrons in the atomic structure. Ceramic shells can be made by various processes such as sintering, isostatic pressing, injection molding, slip casting, extrusion etc. Several firms can make thermally conductive ceramics such as Marketech International, WA, Ortech Advanced Ceramics, CA etc. They are made from ceramic powders of very high purity. They are literally melted and compressed to form a continuous phase. Continuous and single phase nature of these ceramics facilitates transfer of heat more easily than the two phase nature of thermoplastics, thermosets or elastomers with fillers that were used earlier in tapes and extrusions. As a result, thermal conductivity of thermally conductive ceramics is relatively high, typically greater than 25 w/mK. The following table summarizes the thermal conductivity of various materials that can be used to make bar insulation. From this table it is clear that single phase ceramics offers thermal conductivity that is significantly higher than that of multiphase materials used in the prior art.

TABLE 1

Thermal conductivity of materials for bar insulation.

| Nr. | Material | w/mK range |
|---|---|---|
| 1 | multiphase tape with fillers | 0.3 to 0.6 |
| 2 | multiphase thermoplastics with fillers | 1 to 3 |
| 3 | Single phase ceramics without fillers | 25 to 280 |

In the shell embodiment 100 shown in FIG. 2-C, the shell 99 is shaped to have hollow rectangular section with a central cavity which fits the stator bar. The cross section of the shell 99 is closed in the sense that it does not have a slit; this is in contrast to an extrusion 5 with a slit 7 investigated in U.S. Pat. No. 7,832,081. Besides, since alumina's dielectric strength is more than twice that of tape insulation, the thickness of the shell 99 in the present invention will be nearly half the thickness of traditional taped bar insulation. The manufacturing process for making embodiment 100 involves four major steps—a method to slip thermally conductive shells over central region of the bar stock 2, a means to bend the bar stock to form end-arms, a method to apply electrical insulation over the end arms, and a method to bond all parts with each other to form a solid body. In the first step the thermally conductive shell member is slipped over the bar stock. The shell insulation comprises at least one long member or multiple shorter shell members which are jointed to each other. Fewest possible joints should be used to join the shell members, and joints are designed to prevent voltage breakdown. In the second step, stator bar is bent to form end-arms. In the third step, thermally insulative tape or extrusion is applied over the end-arms. Both thermally conductive insulation in the straight portion and thermally insulative insulation in the bent portion overlap each other around a transition zone where the straight and bent portions meet. Corona protection layers may be added to the insulation at appropriate places if needed. In the fourth step, the thermally conductive shell, thermally insulative end-insulation and the bent-bar 3 are bonded together to form the stator bar 1.

The present invention has several innovative features which result in significant benefits. Higher thermal conductivity of shells helps increase power or efficiency of the machine, or reduce temperature rise in the stator bar 1. Reducing temperature rise keeps the stator bar cooler, hence increases its life, as it is well known that every 10° C. reduction in temperature doubles the life. Alternatively, one can pump more current and hence increase power of the machine. Or, one can use a smaller conductor to carry same current and hence reduce the size of the machine or reduce its cost. Further, the higher dielectric strength of shells reduces the thickness of bar insulation, freeing insulation space that can be used to conduct flux, thereby reducing the size of the machine. For example, dielectric strength of typical tape insulation is about 60 to 90 volt/mil. In contrast, the dielectric strength of alumina ceramic is about 300 to 750 volt per mil per Harper (1974). Thus even when an alumina ceramic insulation is designed at a conservative 200 volt per mil design point, the thickness of the bar insulation that uses alumina shells will be half that of bar insulation made of conventional tape. The freed bar insulation space can be filled innovatively with either iron or copper and used to reduce size of the machine. In addition, the shells in the present invention do not have any slit in the cross section. Elimination of the slit reduces the risk of insulation failure. Further, thermally conductive shells can be mass produced inexpensively as extrusion, reducing the cost. In addition, the method needs less labor for assembly compared to winding a tape, thereby further reducing the overall cost.

BRIEF DESCRIPTION OF THE DRAWINGS

FIG. 1 shows a stator bar and its location within the stator of an electric machine.

FIG. 2 shows major steps in making thermally conductive ground wall insulation in accordance with the present invention, with FIG. 2-C showing the shell embodiment 100 of the present invention.

FIG. 3 shows a sample butt-joint means to mate two or more shells in the straight portion of the bar stock.

FIG. 4 shows an alternative lip-joint means to mate two or more shells in the straight portion of the bar stock.

FIG. 5 shows an alternative tongue and groove joint means to mate two or more shells in the straight portion of the bar stock.

FIG. 6 shows an alternative dual shell means to mate two or more shells in the straight portion of the bar stock.

FIG. 7 shows a thermal model of thermally conductive bar insulation.

FIG. 8 illustrates the split-shell embodiment 200 of the present invention.

DETAILED DESCRIPTION

FIG. 2-C shows the shell embodiment 100 of present invention. The embodiment 100 employs one or more of thermally conductive and electrically insulative shells 99, abbreviated herein as "shells". The shells 99 have hollow rectangular cross section that defines a central cavity 51 whose axis synchronizes with that of the bar stock 2. The straight bar stock 2 is fitted in this cavity 51. Span MN of shells 99 is greater than the span PQ of the core, but less than the straight span AB of the bar stock 2. The end faces M and N of shells 99 has a beveled portion MF that is less than the overhang MP. At the edge M and N, the thickness 98 of shells 99 equals the thickness of one layer of an insulative tape. The end-arms AC, BD are insulated by end-insulation 4a, 4b made of a tape winding or extruded insulation. End-insulation 4a, 4b cover not only end-arms AC, BD but also cover the overlap zone MR. As shown in FIG. 2-C, the overlap zone MR is defined by the end face M of the shells 99 and end face R of the end-insulation 4a, 4b. In the overlap zone MR both shell-insulation 99 as well as end-insulation 4a, 4b protect the core against voltage breakdown. The tape type end-insulation comprises multiple layers of insulative tape 4a, 4b wrapped tightly. Alternatively, the extruded type end-insulation can be used over the ends. Additional corona protection layers may also be applied if needed in any part of the bar. The process of making the shell embodiment 6 comprises four steps, and starts with a pre-assembled bar stock 2.

FIG. 2-A shows a first step of sliding the shells 99 over a stationary bar stock 2, with the longitudinal axis of shells 99 aligned with that of bar stock 2. In this step, shells 99 cover loosely over the bar stock 2 and are not bonded to it. The clearance between the shells 99 and the bar stock 2 is made as small as practical (to minimize thermal resistance), and just enough for the shells 99 to slide over the bar stock 2 without damaging it. To protect the bar during sliding, the outer surface of the bar stock 2 may optionally be provided with a powder or a thin fabric. FIG. 2-A shows the bar stock 2 covered loosely by the shells 99 in mid-region of the straight portion of bar stock 2 at the end of first step.

FIG. 2-B shows a second step of bending, in which the bar stock 2, covered loosely by shells 99, is bent in a bending fixture (not shown) to form bent end-arms AC, BD. Normally the bar stock 2 can be clamped at sections M, N to facilitate this bending. But in some designs, it may be necessary to clamp the bar stock 2 at its mid-section before bending at sections A, B. In such cases, one clamps the bar stock 2 only, and not the shells 99 so that the copper conductors within bar stock 2 will take up the bending stresses. One arrangement that transfers bending stresses to the copper conductors is to employ shells 99 that are along the axis into two or more smaller shells; the smaller shells are then moved outwards along axis of the bar stock 2 until they reach the beginning of bending, viz., the end faces M, N of the shells 99 synchronize with end sections A, B of straight portion of the bar stock 2. By moving the shells outwards, one creates a space mid-section that is devoid of shells, enabling clamping of the bar stock 2 at its mid-section, before bending it. Alternatively, the split shells can be separated by a small gap, and clamps can be used in these small gaps to clamp the stator bar. After bending the bar stock 2, the clamping means (not shown) is removed and the loose shells 99 are slid inwards along axis of bar stock 2. In an alternative arrangement, one uses shells 99 that are shorter than the core span PQ. These shorter shells 99 are then split into two halves along axis and the split shorter shells are moved outward along the axis of the bar stock 2 allowing clamping of the bar conductors at its mid-section. After bending, the shorter shells 99 are moved back inwards. A person skilled in the art can conceive of other means to bend the bar stock 2 when covered by loose shells 99 without altering the invention.

FIG. 2-C shows a third step of end-arm insulating means, as well as the finished stator bar. In this step, a thermally insulative material (termed "end-insulation") 4a, 4b is applied over the end-arms. As already mentioned, at the edge M and N, the thickness 98 of shells 99 equals the thickness of an insulative tape. Winding the tape is detailed in FIG. 2-D. Winding the tape starts with an edge of a tape 97 in the first layer 91 in flush with the thin edge 98 of shells 99. First layer 91 of the tape 97 thus smoothly transitions the end-insulation from thermally conductive shell to a thermally insulative tape with near-zero air-gap. Tape 96 in the second layer 92 is wound with half-lap over the tape 97, i.e., half of its width in contact with tape 97 while other half is in contact with shell's beveled edge. This half-lapping "caps" any air-gap in the first layer, thereby preventing voltage breakdown. Multiple layers of tape are wound in this half-lap fashion over the face M normal to axis, over the beveled surface MF and over the outer surface FR of shells 99. A person skilled in the art can conceive of alternative arrangements to create similar robust tape/shell transition without altering the invention. Alternatively, the end-insulation can be made of an extrusion with a hollow rectangular section with a central cavity shaped to fit with the end arms 4a, 4b. The extrusion can be made of a thermoplastic or an elastomeric material. They can be formed as an elastomeric shell without slit or a thermoplastic shell with slit. An elastomeric shell without slit is stretched at inner diameter to fit over end-arm. With a thermoplastic shell containing a slit, after jacketing over end-arm, one closes the slit using techniques such as thermoforming, plastic welding or chemical bonding.

A fourth step involves bonding all the members, viz., the thermally conductive shells 99, thermally insulative end-insulation 4a, 4b and bent-bar 3, to form a rigid mass of an insulated stator bar. The bonding is a very complex process that requires several steps, e.g., defining the bond line requirements, designing a bondline, selecting a bonding resin, selecting a bonding method, defining the bonding procedure including surface preparation, designing a bonding fixture and actual bonding. Some of these steps such as selecting a bonding resin, bonding method etc. are well known and a person skilled in the art can make the correct choice. A key step is selecting the bonding method. Thermoforming may be used to bond thermoplastic shells 99, while chemical bonding may be used to bond elastomeric shells. Vacuum assisted press-curing may be one option to bond tape winding. Vacuum assisted resin transfer molding or vacuum pressure impregnation are preferred methods to bond all parts. Basic features of vacuum assisted bonding a joint 39 joining shell 50 and 59 is shown in FIG. 3-D. The stator bar assembly is warmed up to a specified temperature to remove trapped air. A peelable strip 391 is applied first over the joint 39 to seal it. A vacuum pump 395 is attached to the bond line 39 via a nozzle 396, and a resin injection pump 392 is attached to bond line 39 via a nozzle 393 using an aperture 394 in the peelable strip 391. Resin is pumped into interspaces spaces between all members using the resin injector 392 while vacuum pump 395 is used to vacuum out the trapped air. The resin is injected into the air gaps at prescribed vacuum, pressure and temperature conditions and the resin is then cured at specified temperatures for specified time. Strip 391 is then peeled out and the finished stator bar 1 is tested for voltage and temperature endurance.

Designing the bond line and jointing of two or more shells requires special attention to achieve high voltage protection. The number of joints must be minimized to reduce any chance of voltage failure. FIGS. 3-6 illustrates several examples of various jointing means. This involves defining the jointing surfaces and bondline geometry to prevent relative movement between shells in all directions other than longitudinal direction. Joinable shells may have an optional locking means that prevents their relative movement in the longitudinal direction also. Generally a first end 52 of a shell has a male plug feature while a second end 53 has a female socket feature. Male plug in one shell, when mated with a female socket in another shell forms a jointed shell. The zone at which they mate and join together is called a joint. Joints can be made in various styles with distinctive features as discussed below.

FIG. 3 illustrates a shell 30 with the plug and socket features for joining by a butt-joint. The cross-section 56 of a shell 30 is rectangular and hollow, without any slit, and defines a central cavity 51 which conforms to bar stock 2. Shell 30 has a first end 52, and a second end 53 which are perpendicular to its axis. Both ends 52, 53 have flat faces 36a, 36b which are used for making a butt joint. FIG. 3-B shows an isometric view of how the shells 44, 50, 59 are joined at 38, 39 by butting and bonding one face 36a of one shell with second face 36b of adjacent shell, thereby forming a butt-joint. FIG. 3-C shows cross sectional view of butt joints 38, 39 joining the shells 44, 50, 59. Butt joints 38, 39 are mechanically weakest as they rely on the bonding resin to attach shells together. It is also electrically weakest as length of the bond line is small so it forms an easy path for voltage breakdown. Because a butt-joint is weak, they are not a preferred choice. It is presented herein only to illustrate the geometrical features of thermally conductive shells.

FIG. 4 shows lip-joint features in another shell 44. FIG. 4-A shows a front view of the shell 44 when a first end 52 faces the viewer. End 52 has an outer lip 46a, i.e., a protrusion bounded by outer face 48a and inner face 47a. FIG. 4-B shows another shell 30 when a second end 53 faces the viewer. The second end 53 has inner lip 46b which is bounded by inner face 47b and outer face 48b. FIG. 4-C shows how these two shells 44 and 30 are joined by lap-joint. To join, the inner face 47a of the outer lip 46a mates with the inner face 47b of inner lip 46b. In addition, the outer face 48a of outer lip 46a mates with the outer face 48b of inner lip 47b. FIG. 4-D illustrates the cross-section of shells 44, 30, 49 that are joined by lap-joints 47, 48.

FIG. 5 shows tongue-and-lip joint features in another shell 60. FIG. 5-A shows shell 60 when a first end 52 faces the viewer. The first end 52 has tongue 66a, i.e., a protrusion bounded by an outer face 67a and faces 68a, 69a. FIG. 5-B shows shell 60 when a second end 53 faces the viewer. The second end 53 has a groove 66b that conforms to the tongue 66a and is bounded by middle face 67b and faces 68b, 69b. FIG. 5-C illustrates cross-section shells 64, 60, 69 joined together by tongue-and-groove joints 67a, 67b. Comparing FIG. 4-D and FIG. 5-C, it is clear that the bond line for the tongue- and groove-joint is longer than that of lap-joint. Hence the tongue-and-joint has a greater ability to prevent voltage breakdown.

FIG. 6 shows dual butt joint features of dual shells. The outer shell 75 in FIG. 6-A is made of half the thickness of the shell insulation, has a hollow rectangular cross-section 74b and its end faces 72b, 73b define a cavity 76b. FIG. 6-B illustrates an inner shell 73 which is also half thickness of insulation and having a hollow rectangular cross-section 74a and with end faces 72a, 73a, its outer periphery fitting into cavity 76b of outer shell 75. Inner periphery of cross section 74a defines a cavity 76a. This cavity 76a conforms to and fits the bar stock 2. The outer shell 75 is slipped over inner shell 73 until end face 72b is at midline MM of inner shell 73. FIG. 6-C shows cross-section of the shell 99 assembled over bar stock 2 using outer shells 75, 76 and inner shells 71, 73, 77. The shells form but joints 78a, 78b, and 78c as shown in FIG. 6-C. but alternate joints such as lip, tongue and groove etc can also be used to increase voltage endurance.

Jointing surfaces in ends 52, 53 may be optionally provided with a bonding coat for bonding. Outer surface of shell 50 may be optionally provided with a resistive layer, termed slot armor, to provide for small relative motion and to even the electrical stresses. One flat face of shell 50 may be optionally provided with through holes for venting or injecting impregnating resin that bonds shell with shell, and shell with bar stock. Even though only few styles of joining shells, viz., lip joint, tongue and groove joint, dual shell joint are illustrated here in, a person skilled in art can conceive of alternative styles of joints that can resist high voltages. The scope of this invention encompasses any means which are used to join two or more shells.

FIG. 8-A illustrate the split-shell embodiment 200 of the present invention. The split-shell embodiment 200 is identical to that shown in FIG. 2-C except that the shells 99 in FIG. 2-C are split along longitudinal axis into two equal halves 209, 210 which are then bonded by a longitudinal joint 47. The end arms 3a, 3b are then insulated by tape winding or extrusions 4a, 4b and contain transition zones 36 as in the shell embodiment shown in FIG. 2-C. FIG. 8-B shows the cross section of split shells 209, 210. the cross-section of each split shell having a the shape of U. FIG. 8-C shows a dove tail joint 47 that joins end faces of split shells 209, 210. The split shells 209, 210 are made of single phase material as in shells 99 and occupy the same geometrical space. The advantage of embodiment 200 over embodiment 100 is that in the embodiment 200, the bar stock 2 can be bent using existing bending fixtures to form bent-bar 3, and the split-shells 209, 210 can then be inserted in the central straight portion of the bent bar 3. Hence embodiment 200 eliminates the step 3 required in formulating the embodiment 100. But since the bar insulation 200 is made of brittle ceramic and hence is unbroken, the resulting stator bar 1 is somewhat brittle. So it may not be flexible enough to meet the bending requirements, whereas in embodiment 100 the bond lines are designed to be flexible, so the bending stresses are taken up more by the flexible joints and less by the ceramic shells 99.

FIGS. 7-A and 7-B further detail how the embodiments 100 or 200 can produce a stator bar with superior thermal conductivity. FIG. 7-A shows the key components in the heat path. These are first, the shell 99 and second, the bond line 43 of the resin that bonds the bar stock 2 and shell 99. FIG. 7-B shows a simplified thermal resistance model of the bar stock. The model comprises two resistances—resistance of thermally conductive shell $R_1$, and resistance of the bond line $R_2$. Since both resistances are in series, the net thermal resistance R is given by $$R = R_1 + R_2 = \frac{l_1}{k_1 A} + \frac{l_2}{k_2 A} \quad (1)$$

where $l_1$, $k_1$ denote thickness and thermal conductivity of shell 99 while $l_2$, $k_2$ denote thickness and thermal conductivity of bond line 43 respectively. "A" denotes the heat transfer area perpendicular to the heat flow path. Net resistance can then be written as $R=l_1/(k_{e\!f\!f} A)$ where effective thermal conductivity of stator bar $k_{e\!f\!f}$ is $$k_{e\!f\!f} = \frac{k_1}{1 + \frac{k_1}{k_2}\frac{l_2}{l_1}} \quad (2)$$

Using this equation, we show below that a stator bar 2 employing thermally conductive shell 99 has superior thermal conductivity.

Example

Consider a stator bar 2 comprising 0.125" thick Alumina shell 99 ($k_1$=25 w/mK, $l_1$=0.125") with a 0.005" thick bond line ($k_2$=0.3 w/mK, $l_2$=0.005"). Plugging these values into equation (2) indicates that the effective thermal conductivity $k_{e\!f\!f}$ of Alumina shelled stator bar will be 5.8 w/mK. This is significantly higher than the 0.6 to 1 w/mK thermal conductivity that has been achieved so far by the prior art employing tape insulation. Since temperature rise is directly proportional to the thermal resistance, a stator bar using thermally conductive shell insulation will be significantly cooler as shown below.

Consider a prior-art stator bar with taped bar insulation, having an effective thermal conductivity of 0.6 w/mK. Assume that the stator core is at 100° C. while the stator bar is at 150° C., so that temperature rise is 50° C., and assume that this rise is mostly due to the bar insulation. Replacing the prior-art taped bar insulation with thermally conductive shell insulation in accordance with the present invention leads to an effective thermal conductivity of 5.8 w/mK as shown above. This higher thermal conductivity reduces the temperature rise from 50° C. to (50) (0.6/5.8)=5.2° C. Thermally conductive shell insulation hence greatly reduces the stator bar temperature from 150° C. to 105° C. This is a significant reduction in the stator bar temperature. Thus the thermally conductive shell insulation presented in this invention keeps the stator core and stator bar significantly cooler.

What is claimed is:

1. A stator bar for conducting large currents, the stator bar being mounted in a stator core and comprising:
    a conductor having a longitudinal form, the conductor having one middle straight part and two similarly bendable ends;
    a thermally conducting and electrically insulating shell, the shell enveloping the middle part of the conductor so that the length of the shell is less than the length of the middle part of the conductor, the cross section of the middle part of the conductor being of the same form that the cross section of the shell is, and
    a thermally and electrically insulating material enveloping the remaining of the middle part and the both ends of the conductor and overlapping the end parts of the shell;
    wherein the stator bar is mounted to the stator core such that the shell is between the core and the conductor and such that two ends of the conductor are bent in the direction off the core.

2. The stator bar of claim 1, wherein there is a small clearance between the shell and the conductor to allow sliding the shell over the conductor without damaging it.

3. The stator bar of claim 1, wherein the shell has beveled face ends to provide more cramped contact between the end parts of the shell and the insulating material overlapping them, which allows avoiding air gaps between the end parts of the shell and the insulating material.

4. The stator bar of claim 1, wherein the shell is made of single phase materials with thermal conductivity greater than 1 w/mK.

5. The stator bar of claim 4, wherein the single phase materials are thermoplastics, thermosets, elastomers or ceramics.

6. The stator bar of claim 1, wherein the insulating material is a thermally and electrically insulating tape wound round the remaining of the middle part and the bent ends of the conductor and overlapping the end parts of the shell.

7. A stator bar for conducting large currents, the stator bar being mounted to a stator core and comprising:
    a conductor having a longitudinal form, the conductor having one middle straight part and two similarly bendable ends;
    a thermally conducting and electrically insulating shell, the shell enveloping the middle part of the conductor so that the length of the shell is less than the length of the middle part of the conductor, the cross section of the middle part of the conductor being of the same form that the cross section of the shell is, the shell being configured to be split into two halves along the longitudinal axis of the conductor; and
    a thermally and electrically insulating material enveloping the remaining of the middle part and the both ends of the conductor and overlapping the end parts of the shell;
    wherein the stator bar is mounted to the stator core such that the shell is between the core and the conductor and such that two ends of the conductor are bent in the direction off the core.

8. The stator bar of claim 7, wherein there is a small clearance between the shell and the conductor to allow sliding the shell over the conductor without damaging it.

9. The stator bar of claim 7, wherein the shell has beveled face ends to provide more cramped contact between the end parts of the shell and the insulating material overlapping them, which allows avoiding air gaps between the end parts of the shell and the insulating material.

10. The stator bar of claim 7, wherein the shell is made of single phase materials with thermal conductivity greater than 1 w/mK.

11. The stator bar of claim 10, wherein the single phase materials are thermoplastics, thermosets, elastomers or ceramics.

12. The stator bar of claim 7, wherein the insulating material is a thermally and electrically insulating tape is wound round the remaining of the middle part and the both ends of the conductor and overlapping the end parts of the shell.

13. A stator bar for conducting large currents, the stator bar being mounted to a stator core and comprising:
   a conductor having a longitudinal form, the conductor having one middle straight part and two similarly bendable ends;
   a thermally conducting and electrically insulating shell, the shell enveloping the middle part of the conductor so that the length of the shell is less than the length of the middle part of the conductor, the cross section of the middle part of the conductor being of the same form that the cross section of the shell is, the shell being configured to be split into two or more pieces in the direction normal to the longitudinal axis of the conductor, each of the two or more pieces being configured to be split into two halves along the longitudinal axis of the conductor; and
   a thermally and electrically insulating material enveloping the remaining of the middle part and the both ends of the conductor and overlapping the end parts of the shell;
   wherein the stator bar is mounted to the stator core such that the shell is between the core and the conductor and such that two ends of the conductor are bent in the direction off the core.

14. The stator bar of claim 13, wherein there is a small clearance between the shell and the conductor to allow sliding the shell over the conductor without damaging it.

15. The stator bar of claim 13, wherein the shell has beveled face ends to provide more cramped contact between the end parts of the shell and the insulating material overlapping them, which allows avoiding air gaps between the end parts of the shell and the insulating material.

16. The stator bar of claim 13, wherein the shell is made of single phase materials with thermal conductivity greater than 1 w/mK.

17. The stator bar of claim 13, wherein the insulating material is a thermally and electrically insulating tape wound round the remaining of the middle part and the both ends of the conductor and overlapping the end parts of the shell.

* * * * *